Patented Jan. 5, 1954

2,665,235

UNITED STATES PATENT OFFICE 2,665,235

CALCIUM LACTATE SUPPOSITORY

Richard Fleischmann, Gronau, Hannover, Germany, assignor to Johann A. Wülfing, Gronau, Hannover, Germany, a firm No Drawing. Application May 29, 1951, Serial No. 228,998

Claims priority, application Germany June 1, 1950

3 Claims. (Cl. 167—64)

This invention relates to an improved method of preparing a calcium containing suppository possessing very efficient medicinal properties.

It is known to use calcium lactate and calcium sodium lactate as medicaments in suppository compositions. The solubility properties of these calcium comopnuds have rendered them particularly suitable for such purposes. However, the effectiveness of the suppository depends on the resorption rate of the calcium salt from the matrix of the composition, said resorption rate being dependent on the area exhibited by said calcium salt which is a direct resultant of the degree of comminution of said salt. Thus, it is apparent that satisfactory results are obtained only when the calcium salt is in a very finely divided condition. However, the calcium lactate and calcium-sodium-lactate salts present grave difficulties in this respect, in that when comminuting in a vibrating mill, ball mill, or the like, said salts clump together in the form of large chunks requiring additional grinding. A previous solution to this long-standing problem, devised by applicant, consisted in subjecting the calcium salt to a blast of air while being ground in a ball mill, thereby obtaining a voluminous, finely divided salt. This resultant product can be directly incorporated into the suppository composition or may first be subjected to a further grinding in a vibrating mill prior to its admixture with the basic suppository composition. However, applicant has now solved this problem without resorting to the use of an air stream as a means of maintaining the calcium lactate salts in a finely divided state.

Accordingly, an object of the present invention is the preparation of calcium containing suppositories possessing very efficient medicinal properties.

Another object of this invention is the preparation of a finely divided calcium salt for direct incorporation into the suppository matrix.

A further object of the instant invention is the development of a novel process of preparing a calcium-containing suppository.

Further objects and advantages of the present invention will be apparent from the following description.

It has now been discovered that by dehydrating the calcium lactate salts so that they contain a maximum of up to 2 moles, and preferably only about ½ mole of water of hydration or bound water, said salts are capable of being easily comminuted in a vibrating mill or the like to a finely divided condition. The calcium lactate and calcium-sodium-lactate normally contain above 2 and up to 5 moles water of hydration per mole of calcium salt, thus offering a possible explanation for the agglomeration phenomena exhibited by said salts in the milling apparatus. Likewise, the use of an air stream or an air blast during the grinding process is rendered unnecessary by dehydrating these calcium salts to less than 2 moles water of hydration. The dehydrated calcium lactate salts exhibit no clumping during the grinding process in a vibrating or ball mill, thereby facilitating its incorporation into a suppository matrix in a very finely divided condition which is productive of superior medicinal properties.

The calcium lactate salts are dehydrated to the desired water content by heating at a temperature of about 60 to 110° C. under a vacuum of about 10 to 40 mm. Hg for a period of time sufficient to effect a reduction in the water content to a maximum of 1 to 2 moles, and preferably ½ mole. The dehydrated calcium salts are comminuted in a vibrating mill or other suitable grinding device to yield a voluminous, finely-divided product, which is directly incorporated into a suppository base by melting said base to a temperature of about 40 to 60° C. and intimately admixing the calcium salt with the melted basic composition. By using an agitator, the calcium lactate or calcium sodium lactate can be easily incorporated into the suppository base, forming therewith a homogeneous dispersion. The amount of calcium salt used lies within the range of 19 to 40% by weight of the suppository matrix. Cocoa butter is particularly suitable as a suppository base for the calcium lactate salts. However, other similar materials, such as "Imhausen," "Suppositol," "Schluter 200," etc., may be utilized as the suppository base for the calcium lactate salts.

The following examples are additionally illustrative of this invention, and are not to be construed as limiting the scope thereof:

Example 1

Calcium lactate containing 5 moles of water of hydration $(Ca(C_3H_5O_3)_2 \cdot 5H_2O)$ is heated in a drying chamber at a temperature of 60 to 80° C. until only about 2 moles of water of hydration is combined with the calcium lactate. This predried calcium lactate is heated under a vacuum of 20 mm. Hg to a temperature of 80° C. until the calcium lactate contains only ½ mole of hydration water. 300 parts by weight of this dehydrated calcium lactate is comminuted in a vibrating mill at room temperature for 9 to 10 minutes. The resultant product is in a very finely divided condition.

23.2 parts by weight of this voluminous, finely-divided product containing 16.5% calcium is intimately mixed at a temperature of 40° C. with 76.8 parts of melted cocoa butter, forming thereby a homogeneous dispersion of the salt in the base. This melted mixture is poured into the desired suppository forms.

*Example 2*

19.3 parts by weight of the dehydrated calcium lactate of Example 1 containing ½ mole of water of hydration and ground in a vibrating mill are mixed in a mixing chamber at a temperature of 50° C. with 80.7 parts by weight of the suppository matrix "Imhausen," thereby resulting in a homogeneous dispersion of the salt in said matrix. This melted mixture is poured into the desired suppository shapes. In lieu of the suppository matrix "Imhausen," like amounts of "Suppositol" or "Schluter 200" can be used as the suppository base.

While the invention has been described with respect to specific embodiments, it will be apparent to those skilled in the art that suitable modifications and variations of the invention may be made without departing from the principles and real spirit of the invention.

What is desired to be secured by Letters Patent is:

1. A method of preparing calcium-containing suppositories which comprises dehydrating a calcium salt containing water of hydration selected from the class consisting of calcium lactate and calcium sodium lactate to a maximum water content of about ½ mole water of hydration, comminuting said dehydrated calcium salt to a finely divided condition, incorporating said finely-divided salt into a suppository base, and recovering a suppository of superior medicinal properties.

2. A method of preparing calcium-containing suppositories which comprises dehydrating calcium lactate containing water of hydration to a maximum water content of ½ mole water of hydration by heating at a temperature of about 60 to 110° C. under a vacuum of about 10 to 40 mm. Hg, comminuting said dehydrated calcium lactate to a finely-divided condition, incorporating said finely-divided calcium lactate into a suppository base of cocoa butter, the calcium lactate content constituting 19 to 40% by weight of the base, and recovering a suppository of superior medicinal properties.

3. A calcium containing suppository comprising as the essential ingredient a finely-divided calcium salt containing about ½ mole water of hydration selected from the class consisting of calcium lactate and calcium sodium lactate homogeneously dispersed in a suppository matrix.

RICHARD FLEISCHMANN.

References Cited in the file of this patent

UNITED STATES PATENTS

| Number | Name | Date |
|---|---|---|
| 2,543,976 | Lauter | Mar. 6, 1951 |

FOREIGN PATENTS

| Number | Country | Date |
|---|---|---|
| 17,274 | Great Britain | of 1915 |